Feb. 22, 1938.  L. D. HAFFNER  2,108,855
EDUCATIONAL DEVICE
Filed March 1, 1937
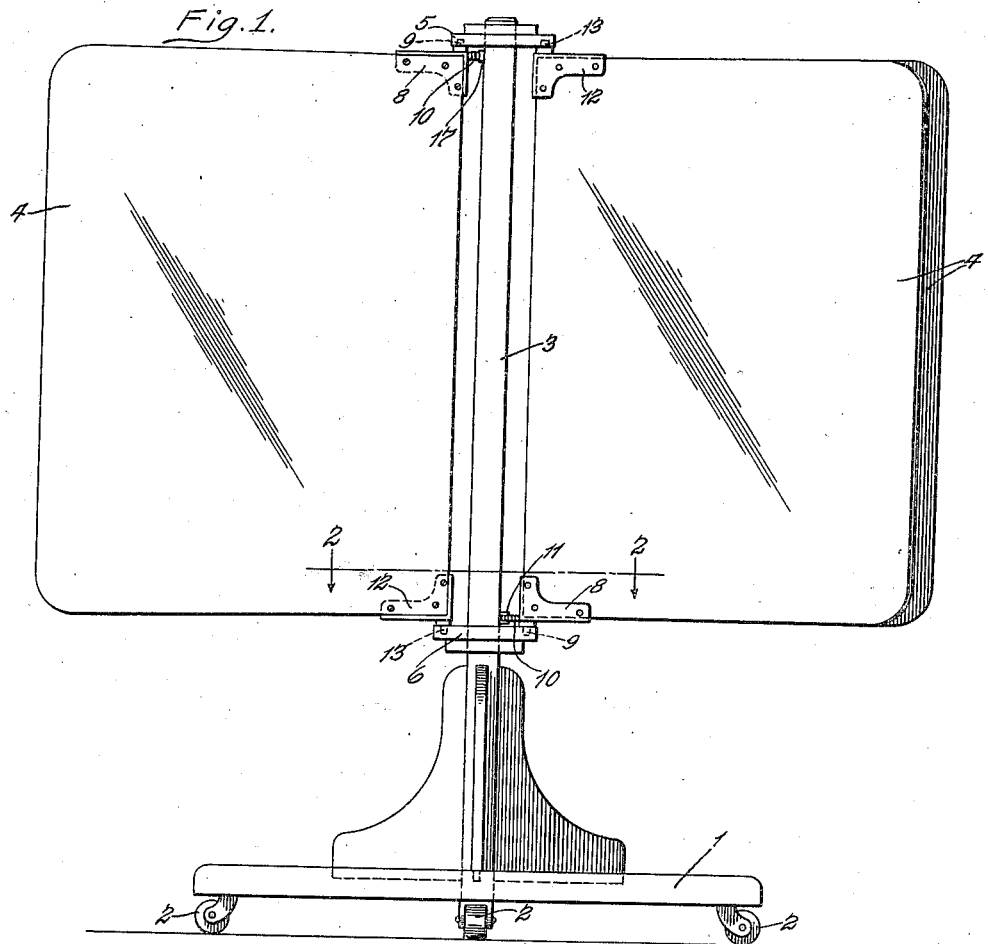
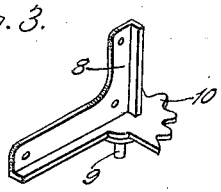
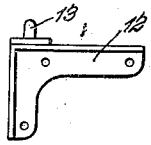
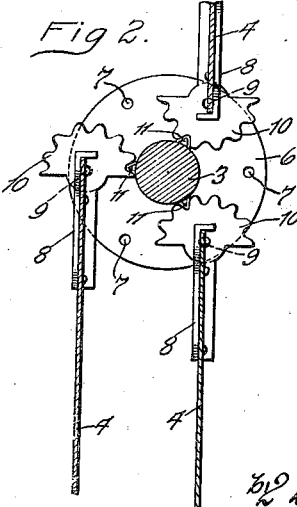
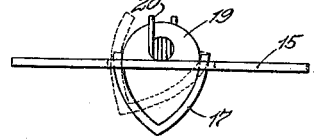
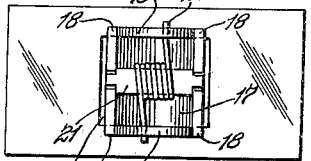

Patented Feb. 22, 1938

2,108,855

UNITED STATES PATENT OFFICE 2,108,855

EDUCATIONAL DEVICE

Louis D. Haffner, St. Louis, Mo.

Application March 1, 1937, Serial No. 128,386

6 Claims. (Cl. 40—72)

This invention relates generally to display devices of the educational type of a character wherein a plurality of exhibits may be arranged for selective exposition.

The object of the present invention generally stated is to provide an educational device of the character referred to having a plurality of leaves arranged for movement so as to expose the subject matter carried by one or more of the leaves.

A further object of the invention is to provide an apparatus of the type referred to wherein the respective leaves may be releasably locked in selected positions.

A more specific object of the present invention is to provide an educational device of the character referred to having a plurality of leaves arranged to display subject matter thereon and which may be conveniently manipulated and moved so as to expose for view the subject matter on one or more of such leaves without interference from the others.

Further objects will be apparent to those skilled in the art when the following description is read in connection with the accompanying drawing in which Figure 1 is a view in front elevation of an educational device constructed in accordance with the present invention.

Figure 2 is a sectional view taken along line 2—2 of Figure 1.

Figure 3 is a perspective view of a fitting shown in Figure 2.

Figure 4 is a perspective view of a modified form of fitting.

Figure 5 is a plan view of a locking device suitable for use in accordance with the present invention.

Figure 6 is a bottom plan view of the locking device shown in Figure 5.

In accordance with the present invention generally stated an educational device of the character referred to is provided with a plurality of of leaves suitable for the exhibition of subject matter and arranged so as to be moved into selected positions so as to expose the subject matter of one or more of said leaves at once, while the remaining leaves are securely held in non-interfering positions. In accordance with the present invention the apparatus is constructed in a manner so as to facilitate movability so as to adapt it particularly for use in school rooms.

Referring now to the drawing for an illustrative embodiment of the present invention, the apparatus shown in Figure 1 comprises a base 1 which may be in the form of a cross and provided at the end of each leg with a suitable caster 2. Extending upwardly from base 1 is a standard 3. Suitably connected to the standard 3 may be a plurality of display leaves 4 so arranged as to rotate relative to standard 3 about axes parallel thereto. In order to effectuate this connection of leaves 4 to standard 3 annular bracket 5 is provided at the upper extremity of standard 3 and a similar annular bracket 6 is provided intermediate the ends of standard 3 in a position such as to receive leaves 4 between said bracket 6 and bracket 5. Said brackets 5 and 6 may be securely connected to standard 3 and be provided with a laterally extending flange part near the periphery of which a plurality of recesses 7 may be arranged as shown in Figure 2. While the bracket 6 is shown in Figure 2, it will be understood that bracket 5 may be identical with bracket 6 but conveniently may be employed in inverted relation. Recesses 7 may extend entirely through brackets 5 and 6 in a direction parallel to standard 3 but in the case of the lower bracket 6 it is preferable that such recesses do not extend entirely through the thickness of the bracket, but on the contrary that such recesses 7 have their lower ends closed so as to provide thrust bearings for hinge parts which cooperate therewith.

Connected to the lower inside corner of each of leaves 4 is a fitting 8 having a pin 9 arranged to seat into a corresponding recess 7 of bracket 6. In the embodiment shown in the drawing fittings 8 are also provided with an arcuate rack 10 concentric with pin 7 and arranged to cooperate with a detent 11. It will be understood that each of leaves 4 is provided with such a bracket 8 and cooperating detent 11.

The opposite inside corner of each leaf 4 is provided with a suitable fitting for hinging it to bracket 5. In the embodiment shown in the drawing the ratchet fittings 8 are arranged alternately at the top and bottom respectively of adjacent leaves 4 with fittings 12 at the opposite inside corners as shown. In accordance with one embodiment fittings 12 of the character illustrated in Figure 4 may be employed, but it will be understood that fittings 8 may, if desired be employed in this position instead of or in addition to their employment at the lower inside corner of each of leaves 4. Fitting 12 is provided with a pin 13 arranged for cooperation with recesses in bracket 5.

With the arrangement of parts just described it will be understood that each of leaves 4 is hingedly mounted for movement about an axis extending parallel to standard 3 through pins 9 and 13 of fittings 8 and 12 respectively.

In order to provide for convenient retention and release of the respective leaves 4, detents 11 may conveniently be made of a tumbling type wherein the part which engages the teeth of rack 10 is so constructed and arranged as to yield or tumble in the direction of and in response to force supplied through the teeth of rack 10. One such detent device of the tumbling type is illustrated in Figures 5 and 6. Such a device may comprise a base plate 15 having a central aperture 16 into which is fitted a tongue piece 17. Such tongue piece 17 may be inserted through aperture 16 from the rear and is provided with lateral projections 18 of such extent as to prevent tongue piece 17 from being forced entirely through aperture 16. Base plate 15 is provided with a pair of bosses 19 arranged to receive the opposite ends of a coiled spring 20 as shown in Figure 6. The body of the coiled spring 20 is arranged about a core piece 21, the ends of which are connected to tongue piece 17. With this arrangement of parts it is apparent that the normal action of spring 20 is to force tongue piece 17 into the position shown in full lines in Figure 5, but the tongue piece is nevertheless so arranged as to be tumbled to the position illustrated in dotted lines in response to the application of a force thereon from right to left. Similarly, the application of an opposite force to tongue piece 17 will tumble it in the opposite direction.

It will be understood that one such tumbling detent device is provided in accordance with the present invention for each of leaves 4, suitable recesses being formed in standard 3 to accommodate the movement of tongue piece 17.

In the embodiment shown in the drawing the apparatus is constructed and arranged to receive six such leaves as 4 but it will be understood that any number of leaves may be provided so long as fittings 8 with their adjunct racks 10 are disposed so as not to interfere with each other. In the embodiment shown it is obvious that the distance between the hinging centers of the alternate leaves 4 (i. e. distance between alternate recesses 7) is greater than the diameter of rack 10 and so long as this condition prevails, any number of leaves 4 may be provided.

With the arrangement of parts just described it is apparent that the invention accomplishes its objects and that an educational display device is provided wherein the subject matter of any leaf may be exposed for view without interference by the others and even if the apparatus is used in positions where it is exposed to the wind, the inactive leaves are securely held in such non-interfering positions that the instruction or exhibition may proceed uninterrupted. Moreover, by mounting the entire aparatus so as to be readily movable, the device may not only be moved from one position to another in a school room, but may be revolved so as to successively bring a number of leaves 4 carrying a series of exhibits into view. While in the embodiment illustrated, standard 3 is rigidly connected to base 1, it will be understood that if desired such standard may be mounted for rotation about its own axis.

In order to provide for convenient removal and replacement of leaves 4, the leaves with their adjunct fittings 8 and 12 maybe bodily removed from the standard and other such leaves substituted. In order to accomplish this with facility, pins 13 of fittings 12 may be made substantially longer than pins 9 of fittings 8. Brackets 5 and 6 may then be arranged in spaced relation such as to permit a slight vertical movement of each of leaves 4. Alternatively the upper bracket 6 may have its recesses 7 provided with resilient false bottoms so that while intentional limited vertical movement of the leaves is possible, there is normally a seat adjacent the ends of the upper pins 9 or 13 as the case may be.

With such an arrangement it is evident that when leaves 4 are lifted sufficiently to remove the shorter pins 9 from their corresponding recesses, the leaves may be readily removed from the upper bracket 5 by a corresponding downward movement in a well known manner.

From the foregoing description it should be apparent that the present invention accomplishes its objects and that an apparatus is provided which is particularly adaptable for the display of subject matter for the purpose of instruction or exhibition. While in the foregoing description and in the accompanying drawing a complete disclosure of one embodiment of the invention has been made, such embodiment is not to be understood as limiting the invention but on the contrary, is to be understood as merely illustrative of the features thereof. It is to be distinctly understood, therefore, that such modifications and the use of such individual features and subcombinations of features as do not depart from the spirit of this invention are, although not specifically described herein, contemplated by and within the scope of the appended claims.

Having thus described the invention what is claimed is:

1. An educational device comprising a base, a standard, a bracket carried by said standard, a leaf, a fitting secured to said leaf and hingedly connected to said bracket, said fitting having an arcuate rack part concentric with the axis of said hinge connection, and detent means carried by said standard for cooperation with said rack.

2. An educational device comprising a base, a standard, a bracket carried by said standard, a leaf, a fitting secured to said leaf and hingedly connected to said bracket, said fitting having an arcuate rack part concentric with the axis of said hinge connection, and detent means carried by said standard for cooperation with said rack, said detent means being arranged to tumble in the direction of and in response to force applied through said ratchet.

3. An educational device comprising a base, a standard, an annular bracket connected to the top of said standard, a second annular bracket carried by said standard in vertically spaced relation to said first bracket, each of said brackets having a series of recesses arranged therein, leaves carried between said brackets, fittings connected to said leaves and provided with pins for cooperation with said recesses in said brackets, arcuate ratchets on some of said fittings, and detent means carried by said standard for cooperation with said ratchets.

4. An educational device comprising a base, a standard, an annular bracket connected to the top of said standard, a second annular bracket carried by said standard in vertically spaced relation to said first bracket, each of said brackets having a series of recesses arranged therein, leaves carried between said bracket, fittings connected to said leaves and provided with pins for cooperation with said recesses in said brackets, arcuate ratchets on some of said fittings, and detent means carried by said standard for cooperation with said ratchets, said detent means being arranged to tumble in the direction of and in response to force applied through said ratchet.

5. An educational device comprising, a base, a standard, a bracket carried by said standard, a plurality of leaves, each of said leaves being provided with a fitting secured thereto and hingedly connected to said bracket, said fittings having an arcuate rack part concentric with the axis of said hinge connection, and a plurality of detent means carried by said standard for cooperation respectively with the racks of the respective leaves.

6. An educational device comprising, a base, a standard, a bracket carried by said standard, a plurality of leaves each provided with a fitting, said bracket having a plurality of circumferentially spaced hinging centers each arranged to cooperate with one of said fittings, said fittings having an arcuate rack part concentric with the hinging axis thereof, detent means for cooperating with said rack, the distance between said hinging centers being greater than the diameter of said arcuate racks.

LOUIS D. HAFFNER.